3,097,824
TURBINE, WHEEL CONTAINMENT

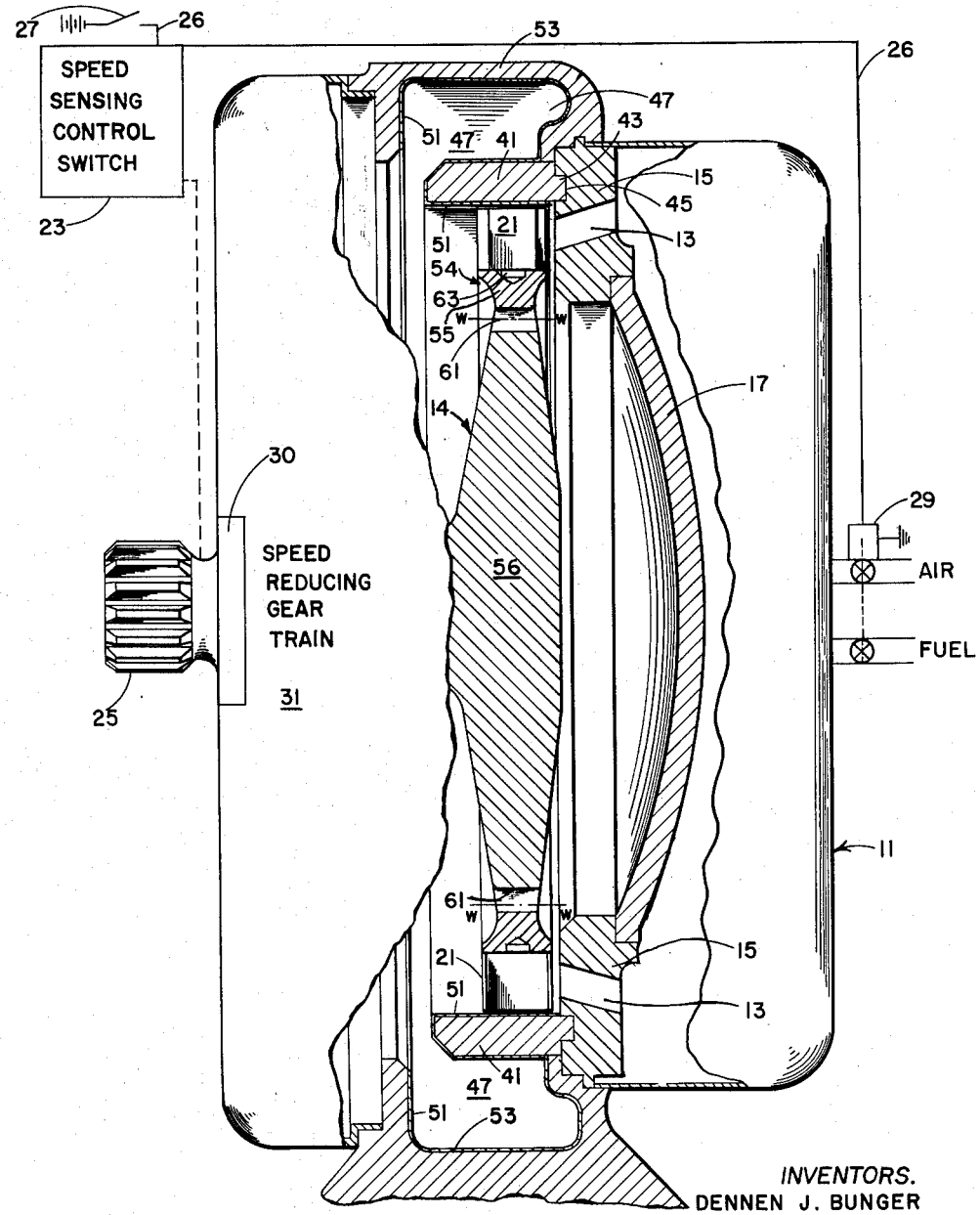
FIG. I
INVENTORS.
DENNEN J. BUNGER
FRANCIS V. EMERY
ALPHONSE A. CAVALIER
JOHN H. FERGUSON JR.
HENRY R. SCHMIDER
HOWARD A. ALEXANDERSON
BY Robert W. Ely
ATTORNEY

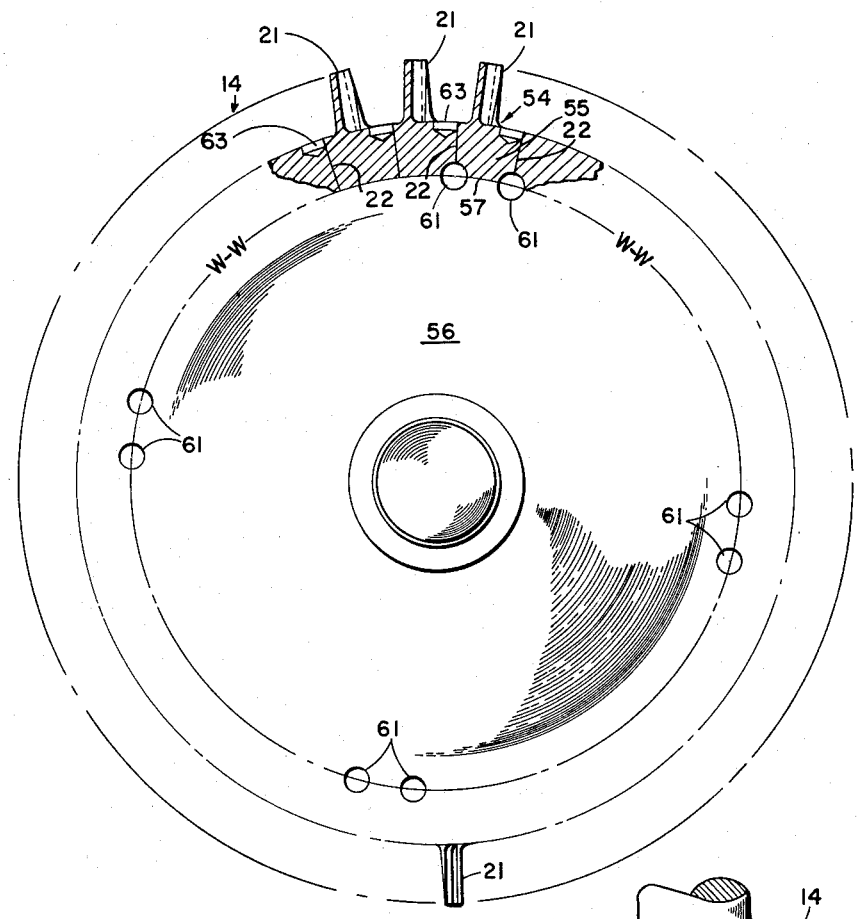
FIG. II
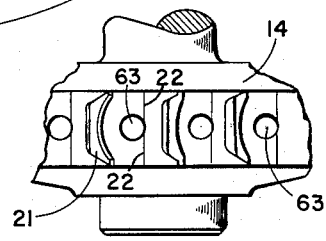
FIG. III
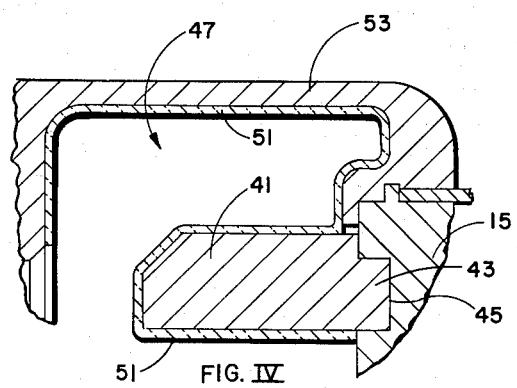
FIG. IV
INVENTORS.
DENNEN J. BUNGER
FRANCIS V. EMERY
ALPHONSE A. CAVALIER
JOHN H. FERGUSON JR.
HENRY R. SCHMIDER
HOWARD A. ALEXANDERSON
BY Robert W. Ely
ATTORNEY

United States Patent Office 3,097,824
Patented July 16, 1963

Dennen J. Bunger, Whitesboro, Francis V. Emery, New Hartford, Alphonse A. Cavalier, Utica, John R. Ferguson, Jr., Sauquoit, and Henry R. Schmider and Howard A. Alexanderson, Utica, N.Y., assignors to The Bendix Corporation, a corporation of Delaware
Filed Nov. 26, 1958, Ser. No. 776,494
3 Claims. (Cl. 253—77)

This invention relates to high-speed turbine devices and more particularly concerns such high energy turbine devices which, upon failure of normal controls, require arrangements to prevent, with safety, a turbine wheel from completely disintegrating at the peripheral section at overspeed due to centrifugal forces and/or arrangements to contain safely the fragments after separation of some turbine blades at overspeed.

Current turbine-driven mechanisms which employ high speed turbine wheels as the prime mover or actuator rely upon speed-limiting devices to prevent the turbine wheel from accelerating to the point where the stresses developed within the wheel, due to its rotational speed, exceed the safe operating stresses of the material from which the turbine wheel is fabricated. When these speed governing devices malfunction, the turbine exceeds its stress limitations and bursts in an uncontrolled manner releasing blades and fragments from the disc. These released blades having exceedingly high amounts of energy obviously can cause damage to the turbine and associated equipment and/or injury to personnel. Such a problem exists in air turbine starters for jet engines in aircraft.

An object of the present invention is to provide an improved high-speed turbine device having safety means for preventing dangerous disintegration and for providing turbine slowdown and safe containment of turbine fragments without adverse effect on the turbine housings or the connection to the driven device.

Another object is the provision of a turbine wheel having reduced weight at the periphery and an arrangement for controlled failure of the turbine blades at overspeed whereby the fracture speed and fragment size are accurately controlled.

An additional object is the provision of a turbine device having an improved turbine wheel construction which cooperates with a containment ring and a ceramic coating on the ring to give controlled failure and safety.

A further object is the provision of a turbine for a jet-engine turbine starter which is constructed and arranged to prevent damage to personnel and the aircraft due to fragmentation of the turbine wheel at overspeed after the speed-limiting control malfunctions.

The achievement of the above objects along with the features and advantages of the invention will be apparent from the following description and the accompanying drawing in which:

FIG. 1 is a partially-cross-sectioned side view of an aircraft starter embodying the invention and shows a turbine wheel having diametrically-located safety holes at the weld-attached bottoms of turbine blade elements and a peripheral containment ring;

FIG. 2 is an end view of the turbine wheel with some blades omitted and shows the circumferential location of the safety holes and has cross-section through the center of some of the reduced-weight blades and rim;

FIG. 3 is a top view of a segment of the turbine wheel and shows the above-mentioned reduced-weight blades and weight-reducing holes in the rim of the turbine wheel; and FIG. 4 is an enlarged, cross-sectional side view of the top of the starter of FIG. 1 and shows the heavy, radially-restrained containment ring having highly-abrasive ceramic coating facing the blades.

Referring to FIG. 1, a source of turbine-driving gases, such as a combustion chamber, is identified by reference numeral 11. The gases pass through equi-spaced inclined nozzles 13 in nozzle ring 15 to which the forward wall 17 of the combustion chamber 11 is attached. Gases from nozzles 13 impinge on the curved or bucketed surfaces of axial flow turbine blades 21. The blade surfaces and the angle of the nozzles 13 are designed so that maximum efficiency is obtained as the turbine wheel 14 approaches cut-off speed.

By reference to FIGURE 2, it is to be noted that the bases 55 of the blades 21 at the periphery of the turbine wheel 14 have abutting radial sides 22.

At cut-off speed (a speed well-below the safe limit), the starter turbine is shut-down by the speed-sensing swich 23 which has a centrifugal device responsive to turbine speed as indicated by the dashed line to the engine-connecting member 25 of the starter. Switch 23 will break the electrical circuit 26 (which was initially provided by closing start-up switch 27) to the gas control device 29 which regulates the supply lines of combustion-producing fluids, pressure-reduced compressed air and jet fuel. The gas control device 29 is shown as a dual solenoid valve which cuts off the supply of air and jet fuel. Thus, in normal operation when the jet engine (not shown) is connected to spline 25 and is rotating at starting speed and, of course, when the starter is rotating at predetermined speed, the turbine starter will be shut-down by speed sensing switch 23. Since the jet engine will tend to drive the starter, a suitable conventional overrunning sprag-type clutch or disengaging means 30 (shown diagrammatically) is provided in the speed-reducing gear train 31 (shown diagrammatically).

However, as suggested above, failure of the overrunning clutch 30 (so that the starter does not drive the jet engine and gives a no load condition) causes the starter to speed to destruction so rapidly that the speed-sensing switch 23 is not always effective. Likewise, if switch 23 fails or dual valves 29, the starter can speed to destruction.

With reference to FIGS. 1 and 4, it can be seen that the starter is provided with a heavy, forged, stainless steel containment ring 41 which is rigidly-restrained by having a heavy shoulder 43 fitted or mounted in an annular recess 45 in the outer turbine side of the nozzle ring 15. Ring 41 is forged to give high-hoop strength or the inability to stretch. It can be realized that it is impossible to flip up the ring 41 which also provides the radially-outer channel wall for the turbine-powering gases. The exhaust gases flow over the left edge of ring 41 to exhaust chamber 47 from which exhaust duct (not shown) provides an exit. The inner wall of the exhaust chamber is spray-coated with a ceramic coating (aluminum oxide) 51 which is sprayed on after the metal surface of the exhaust wall 53 is metallized. This spraying process is performed as follows: An oxy-acetylene torch (manufactured by the Metallizing Engineering Co.) sprays the aluminum oxide base ceramic on a clean surface which has been grit-blasted with 25/40 steel grit and then undercoated with a conventional bonding agent. Coating 51 on the exhaust walls serves to protect metallic surfaces from excessive heat and hence acts as a thermal insulator.

With reference to FIGS. 1, 2 and 3, it can be realized that blades 21 are the outer parts of blade elements 54 which also have heavy rim parts 55. Blade elements 54 are circumferentially positioned in abutment around the periphery of the wheel disc 56 and are attached to the disc 56 by welding at the circular contact line or disc periphery W—W (shown in FIG. 2) and the assembly is machined to provide the turbine wheel 14 having the radially-extending cross-section and configuration shown in FIG. 1. This configuration provides a turbine wheel with the lowest-strength, circumferentially-axial cross-section adjacent the juncture of the wheel disc 56 and inner ends of the rim parts 55 of the blade elements. To provide four triggered blade elements 54, four pairs of axial holes 61 are drilled through the turbine wheel 14 at diametrical locations and are respectively centered at the intersection or junction of the radial abutting sides of the rim parts 55 and the periphery of the disc 56 so that half of the holes 61 is in the rim parts 55 and half is in the disc 56. At the outer half of holes 61, the radial facing and abutting sides of rim parts 55 are not attached so that the triggered blade elements 54 are connected to the disc 56 only by reduced cross-sections or failure sections 57 between the pairs of holes 61 (see FIG. 2). It is apparent that the failure section 57 is so dimensioned that a triggered blade element will separate from the disc before other untriggered blade elements can separate or before the other peripheral portions of the turbine wheel tend to separate. The diametrical locations of the pairs of holes 61 do not contribute to unbalancing of the turbine wheel. Balancing and weight reduction is achieved by means of radially-drilled holes 63 in the segmented wheel rim between blades 21. It is to be noted that, when a triggered blade element separates and blade 21 breaks off, the rim part can move radially without circumferential confinement and jam or wedge against the containment ring 41 for shearing other blades 21. Since the radial abutting rim sides of a triggered blade element are not connected to the sides of adjacent rim parts, there will be no resistance to radial movement when the reduced or failure cross section 57 extending between holes 61 is broken due to high centrifugal forces.

As shown in FIG. 4, the inner surface of the forged containment ring 41 is also coated with ceramic 51 as above described. This ring coating 51 is about .030 of an inch thick (giving a clearance of .020″) and will drag any one of the triggered blade elements.

From FIG. 3, it is to be noted that blades 21 are are generally-trapezoidal in cross-section with two inwardly-inclined side walls and have a concave surface for impingement of gases opposite a flat axial-extending front wall. The rim part of the blade elements form the rim section of the wheel 14 after welding and machining.

In operation when there is a failure of the normal speed-limiting control and/or a break in the gear train from the turbine wheel, the rim part of one of the triggered blades at a pair of holes 61 will be subjected to high stress along the failure section which extends along the original-metal abutment line in the weldment and at the circumferential line between the pairs of holes 61. It is to be remembered that the radial sides of abutting rim parts are not attached outwardly of holes 61 in the weld zone. In a typical combustion starter, the speed-limiting control is set to operate at 44,000 r.p.m. which is above the normal engine starting speed at which speed the jet engine normally overruns the starter. At a predetermined overspeed in excess of normal starting speed (about 55-60,000 r.p.m.), the triggered blade segment separates and the tip of blade 21 engages the surrounding, ceramic-coated containment ring 41. When the blade tip engages ring 41, the dragging force causes blade 21 to be broken at its base portion from the rim part 55. Blade 21 is broken at its base because, like a cantilever beam, the highest bending moment is imposed at the base where attached. The high stresses at the slightly larger base cross-section are much larger than elsewhere in the blade due to the distance from the tip. After the removal of blade 21 by engagement with ring 41, the rim part 55, moves radially out of circumferential confinement and is radially confined by ring 41. The rim part frictionally engages ring 41 producing a dragging force on the rim part which breaks off the following blades, moving at a higher velocity. This wedging or jamming of the rim part will result in the shearing of most or all of the remaining blades at their bases. This action causes the turbine wheel 14 to decelerate to rest due to the energy absorption and the absence of blades onto which the turbine driving gases can impinge in order to rotate the turbine wheel. It is to be noted that the ceramic coating in addition to dragging the blade absorbs energy. The advantages of the heavy radially-restrained ring 41 which is not subject to hoop action are apparent. In some instances, two or more triggered blades will fail almost simultaneously. It is apparent that the peripheral weight of the turbine wheel is greatly reduced due to the turbine blade design and the holes 63 in the rim of the wheel. This feature greatly minimizes the effect of the centrifugal forces and provides for reliability and hence greater safety. In tests, containment within an undeformed starter envelope was safely effected at speeds of about 70,000 r.p.m. and there was no separation of starters housings or of the starter from its engine mounting pad due to energy absorption from the disintegrated wheel parts and sheared blades.

From the foregoing it is apparent that the dangers due to failure of speed-governing devices (which permit the turbine to burst and release shrapnel-like particles) have been essentially eliminated by the reliable failure section and controlled predetermined fracture speed of this invention. The peripheral weight reduction obviously permits a lighter-weight containment ring and the rapid and safe shearing of thin blades results in quick slowdown of the turbine since the energy of gases is not imparted to the turbine. No adverse effect on performance characteristics was noted. The highly abrasive ceramic coating helps shearing and provides a reliable means for energy absorption. It is noteworthy that the present invention provides a high order of protection at low cost and low weight and is also effective if there is fatigue failure at low speeds.

It is to be understood that persons skilled in the art can make changes in the disclosed embodiment without departing from the invention defined by the appended claims.

What is claimed is:

1. A turbine comprised of a turbine wheel, said turbine wheel including a disc and a plurality of blade elements extending radially from the periphery of the disc, each blade element having a rim part and a thin peripheral blade, said blades having tips which are free of connecting structure, nozzle means adjacent said blades and arranged to direct gases to said blades, a heavy containment ring facing the tips of said thin peripheral blades and providing a channel wall for confining gases flowing through said blades, said rim parts having radial sides in abutting relation and having an axial cross-section which flares radially outwardly to provide a turbine wheel rim, said blade elements being attached to said disc by being welded to the periphery of said disc at the radially-inner end of each of said rim parts of said blade elements, each of two of said blade elements at diametrically opposite locations having at its inner end a reduced cross-section between one abutting radial side of its rim part and the other abutting radial side of its rim part to provide triggered blade elements having only a failure section connected to said disc, the others of said blade elements being free of any reduced cross-section, said failure sections being so dimensioned that said two triggered blade elements can separate before other blade elements tend to separate, said containment ring and said blade elements being so constructed that, when a triggered blade element is separated, it will be radially contained outwardly of said turbine wheel rim and other turbine blades will be sheared off thereby whereby uncontrolled disintegration of a turbine wheel is avoided.

2. A turbine comprised of a turbine wheel, said turbine wheel including a disc and a plurality of blade elements extending radially from the periphery of the disc, each blade element having a rim part and a thin peripheral blade, said blades having tips which are free of connecting structure, nozzle means adjacent said blades and arranged to direct gases to said blades, a heavy containment ring facing the tips of said thin peripheral blades and providing a channel wall for confining gases flowing through said blades, said rim parts having radial sides in abutting relation and having an axial cross-section which flares radially outwardly to provide a turbine wheel rim, said blade elements being attached to said disc by being welded to the periphery of said disc at the radially-inner end of each of said rim parts of said blade elements, each of two of said blade elements at diametrically opposite locations having at its inner end a reduced cross-section between one abutting radial side of its rim part and the other abutting radial side of its rim part to provide triggered blade elements having only a failure section connected to said disc, the others of said blade elements being free of any reduced cross-section, said failure sections being so dimensioned that said two triggered blade elements can separate before other blade elements tend to separate, said containment ring and said blade elements being so constructed that, when a triggered blade element is separated, it will be radially contained outwardly of said turbine wheel rim and other turbine blades will be sheared off thereby whereby uncontrolled disintegration of a turbine wheel is avoided, said nozzle means including a nozzle ring having an annular recess adjacent said blade tips, said heavy containment ring having a shoulder mounted in said annular recess of said nozzle ring for radially restraining said containment ring when a triggered blade segment contacts said ring.

3. The turbine according to claim 1 and being further characterized by said ring having a ceramic coating on its inner surface thereof which faces the tips of said blades.

References Cited in the file of this patent

UNITED STATES PATENTS

| | | |
|---|---|---|
| 1,360,936 | Guy | Nov. 30, 1920 |
| 1,469,045 | MacMurchy | Sept. 25, 1923 |
| 1,634,897 | Davis | July 5, 1927 |
| 2,432,315 | Howard | Dec. 9, 1947 |
| 2,965,355 | Spaeth | Dec. 20, 1960 |
| 2,966,333 | Flanagan | Dec. 27, 1960 |
| 2,987,296 | Ferguson | June 6, 1961 |

FOREIGN PATENTS

| | | |
|---|---|---|
| 24,621 | Sweden | Feb. 8, 1907 |
| 405,301 | Italy | Aug. 4, 1943 |